(12) United States Patent
Oami et al.

(10) Patent No.: US 9,934,442 B2
(45) Date of Patent: Apr. 3, 2018

(54) PASSENGER COUNTING DEVICE, PASSENGER COUNTING METHOD, AND PROGRAM RECORDING MEDIUM

(71) Applicant: NEC Corporation, Minato-ku, Tokyo (JP)

(72) Inventors: Ryoma Oami, Tokyo (JP); Yukie Ebiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 38 days.

(21) Appl. No.: 15/025,968

(22) PCT Filed: Oct. 1, 2014

(86) PCT No.: PCT/JP2014/005018
§ 371 (c)(1),
(2) Date: Mar. 30, 2016

(87) PCT Pub. No.: WO2015/052896
PCT Pub. Date: Apr. 16, 2015

(65) Prior Publication Data
US 2016/0239714 A1    Aug. 18, 2016

(30) Foreign Application Priority Data
Oct. 9, 2013 (JP) ................................. 2013-212249

(51) Int. Cl.
*G06K 9/00* (2006.01)
*G06T 7/20* (2017.01)
(Continued)

(52) U.S. Cl.
CPC ..... *G06K 9/00838* (2013.01); *G06K 9/00369* (2013.01); *G06K 9/00832* (2013.01);
(Continued)

(58) Field of Classification Search
CPC .................................... G06K 9/00; G06T 7/00
(Continued)

(56) References Cited

U.S. PATENT DOCUMENTS

| 6,014,602 A * | 1/2000 | Kithil | B60N 2/002 180/272 |
| 6,919,804 B1 * | 7/2005 | Cook | G07C 9/00 340/541 |

(Continued)

FOREIGN PATENT DOCUMENTS

| JP | 2003-111072 A | 4/2003 |
| JP | 2012-158968 A | 8/2012 |
| WO | 2014/064898 A1 | 5/2014 |

OTHER PUBLICATIONS

International Search Report for PCT Application No. PCT/JP2014/005018 dated Dec. 16, 2014.
(Continued)

*Primary Examiner* — Abolfazl Tabatabai

(57) ABSTRACT

Disclosed are a passenger counting device, etc., for accurately counting the number of occupants in a vehicle, including persons seated in the rear seats thereof. This vehicle passenger counting device comprises: a specific part detection means for detecting a specific part of a vehicle from acquired images and generating specific part detection results; an association means for associating the specific part detection results across images in order to compute a degree of movement of the vehicle and generate vehicle movement information including the result of the said computation; a person detection means for detecting persons who are occupants of the vehicle in the images and generating person detection results including location information of the detected persons; and an integration means for determining
(Continued)

the number of occupants by integrating the person detection results on the basis of the vehicle movement information.

20 Claims, 12 Drawing Sheets

(51) Int. Cl.
*G06T 7/73* (2017.01)
*G08G 1/01* (2006.01)

(52) U.S. Cl.
CPC ............... *G06T 7/20* (2013.01); *G06T 7/73* (2017.01); *G06K 9/00785* (2013.01); *G06T 2207/10004* (2013.01); *G06T 2207/10016* (2013.01); *G06T 2207/30196* (2013.01); *G06T 2207/30201* (2013.01); *G06T 2207/30232* (2013.01); *G06T 2207/30236* (2013.01); *G06T 2207/30242* (2013.01); *G06T 2207/30268* (2013.01)

(58) Field of Classification Search
USPC ........ 382/103, 104, 107; 340/901, 902, 903, 340/904, 933, 938, 988; 701/417, 519
See application file for complete search history.

(56) References Cited

U.S. PATENT DOCUMENTS

| | | | |
|---|---|---|---|
| 7,043,346 B2* | 5/2006 | Kubota | B62D 15/0285 340/932.2 |
| 8,731,244 B2* | 5/2014 | Wu | G06T 5/006 382/105 |
| 8,942,859 B2* | 1/2015 | Rauch | B61B 1/02 701/1 |

OTHER PUBLICATIONS

English translation of Written opinion for PCT Application No. PCT/JP2014/005018.

Philip M. Birch, Rupert C. D. Young, Frederic Claret-Tournier, Chris R. Chatwin "Automated vehicle occupancy monitoring", Optical Engineering, vol. 43, No. 8, pp. 1828-1832, Aug. 2004. Cited in the Specification.

* cited by examiner

PASSENGER COUNTING DEVICE, PASSENGER COUNTING METHOD, AND PROGRAM RECORDING MEDIUM

This application is a National Stage Entry of PCT/JP2014/005018 filed on Oct. 1, 2014, which claims priority from Japanese Patent Application 2013-212249 filed on Oct. 9, 2013, the contents of all of which are incorporated herein by reference, in their entirety.

TECHNICAL FIELD

The present invention relates to a passenger counting device and a passenger counting method for counting the number of passengers on a vehicle, a program recording medium, and the like. The present invention relates particularly to a passenger counting device and a passenger counting method for counting the number of passengers on a vehicle in images captured by a camera set up outside the vehicle, and a program recording medium.

BACKGROUND ART

As a method of capturing images of the inside of a vehicle by a camera set up outside the vehicle and counting the number of passengers, NPL 1, for example, describes a technique for detecting the occupants on a vehicle by detecting, in images of the occupants captured from the outside of the windshield, the faces of the occupants.

CITATION LIST

Non-Patent Literature

NPL 1: Philip M. Birch, Rupert C. D. Young, Frederic Claret-Tournier, Chris R. Chatwin "Automated vehicle occupancy monitoring", Optical Engineering, Vol. 43, No. 8, pp. 1828-1832, August 2004

SUMMARY OF INVENTION

Technical Problem

However, when images of the inside of a vehicle is captured by a camera set up in front of the vehicle, it is possible to detect the occupants seated in the driver's seat and passenger seat but is difficult to detect the occupants seated in the rear seats. Hence, this technique has a problem of not being able to accurately count the number of passengers.

In view of the above, the present invention mainly aims to provide a passenger counting device and a passenger counting method for accurately counting the number of passengers including those seated on the rear seats of a vehicle, and a program recording medium.

Solution to Problem

A passenger counting device according to the one aspect of the present invention includes: specific-part detection means for detecting a specific part of a vehicle in an acquired image and generating specific-part detection results;
association means for calculating a movement amount of the vehicle by associating the specific-part detection results with each other in images, and generating vehicle movement information including a result of the calculation;
person detection means for detecting a person who is a passenger, in the images and generating person detection results including position information of the detected person; and
integration means for integrating the person detection results based on the vehicle movement information and thereby determining number of passengers.

A passenger counting method according to another aspect of the present invention includes: detecting a specific part of a vehicle in each acquired image and generating specific-part detection results;
calculating a movement amount of the vehicle by associating the specific-part detection results with each other in images, and generating vehicle movement information including a result of the calculation;
detecting a person who is a passenger, in the acquired images and generating person detection results including position information of the detected person; and
integrating the person detection results based on the vehicle movement information and thereby determining number of passengers.

In addition, the object is also achieved by a computer program that achieves the passenger counting device or the passenger counting method having each of the above-described configurations with a computer, and a computer-readable recording medium that stores the computer program.

Advantageous Effects of Invention

According to the present invention, it is possible to accurately count the number of passengers including those seated in the rear seats.

DESCRIPTION OF EMBODIMENTS

Exemplary Embodiment 1

A first exemplary embodiment of the present invention is described below with reference to the drawings.

Figure 1:
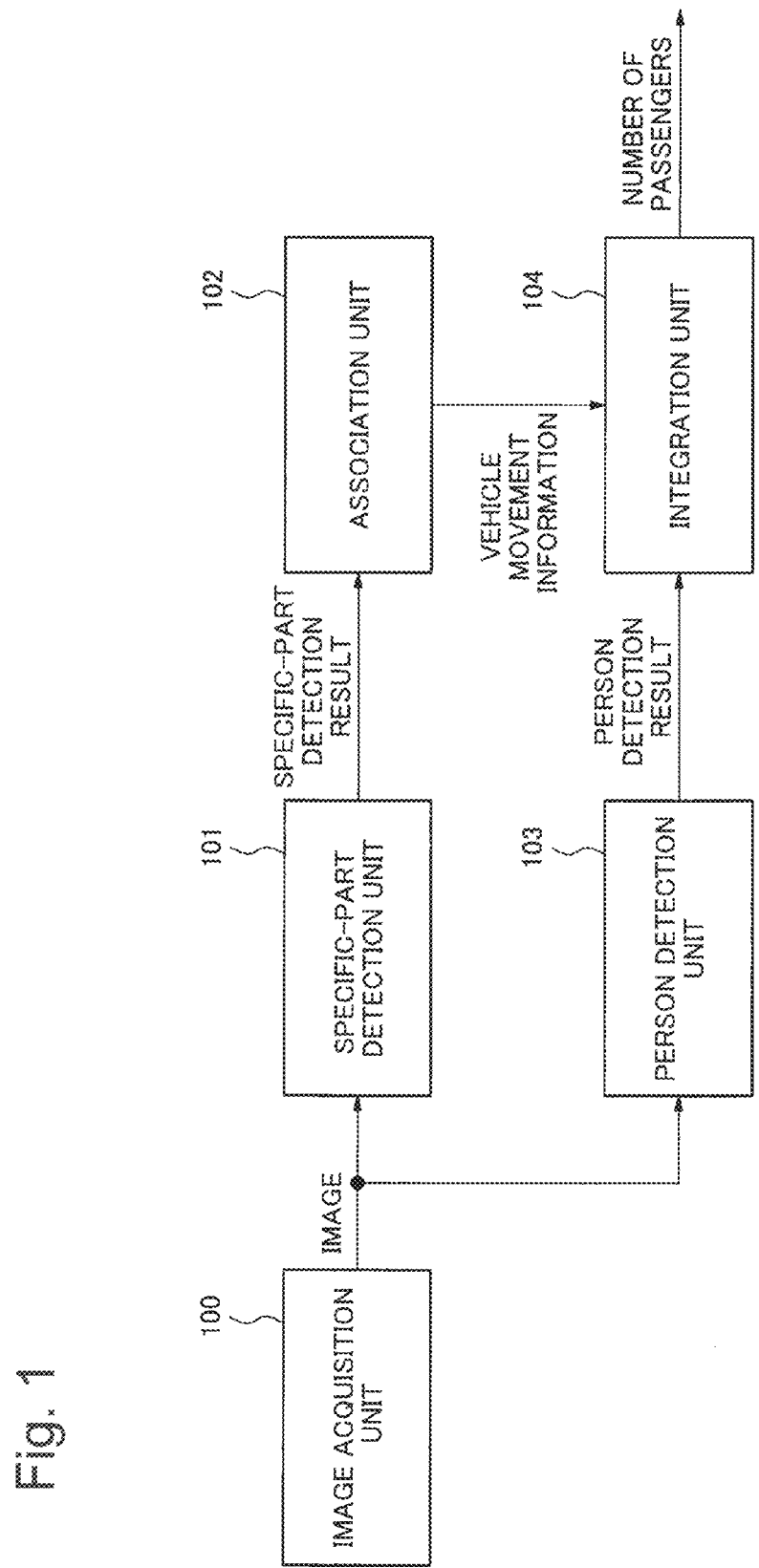
FIG. 1 is a block diagram illustrating a configuration of a passenger counting device according to a first exemplary embodiment of the present invention.

FIG. 1 is a block diagram illustrating a configuration of a first exemplary embodiment of a passenger counting device according to the present invention. As illustrated in FIG. 1, the passenger counting device of this exemplary embodiment includes an image acquisition unit 100, a specific-part detection unit 101, an association unit 102, a person detection unit 103, and an integration unit 104.

The image acquisition unit 100 includes an image capture device, such as a camera, and provides acquired images to the specific-part detection unit 101 and the person detection unit 103. In this exemplary embodiment, the image acquisition unit 100 acquires images at a fixed angle of camera view.

The specific-part detection unit 101 detects a specific part of a vehicle (referred to as "specific part" below) in the image provided by the image acquisition unit 100 and provides the result of the detection (referred to as "specific-part detection result" below) to the association unit 102.

The association unit 102 obtains vehicle movement information by associating the specific-part detection results of the images with each other and provides the obtained vehicle movement information to the integration unit 104.

The person detection unit 103 detects one or more persons in the image provided by the image acquisition unit 100 and provides the result of the detection of a person (referred to as "person detection result" below) to the integration unit 104.

The integration unit 104 calculates the number of passengers by integrating the person detection results provided by the person detection unit 103, on the basis of the vehicle movement information provided by the association unit 102.

The image acquisition unit 100, the specific-part detection unit 101, the association unit 102, the person detection unit 103, and the integration unit 104 are implemented, for example, by a central processing unit (CPU) of a computer configured to operate in accordance with a passenger counting program. The passenger counting program is stored, for example, in a storage device (not illustrated) of the computer. The CPU reads the program and operates as the image acquisition unit 100, the specific-part detection unit 101, the association unit 102, the person detection unit 103, and the integration unit 104 according to the program. Alternatively, the image acquisition unit 100, the specific-part detection unit 101, the association unit 102, the person detection unit 103, and the integration unit 104 may be implemented by individual hardware units.

Next, operation of this exemplary embodiment is described.

First, the image acquisition unit 100 acquires images of the inside of a vehicle chronologically captured from the outside of the vehicle.

In a method of acquiring chronologically captured images, the image acquisition unit 100 may capture an image in response to a trigger given by an external unit or may continue capturing an image at regular intervals.

The image acquisition unit 100 may use an infrared projector in order to capture clear images of occupants in the vehicle. In other words, the image acquisition unit 100 may include an infrared projector as the image capture device. In this case, the image acquisition unit 100 can capture images with light in the infrared region. In order to reduce the influence of visible light, the image acquisition unit 100 may capture images by the use of a band-pass filter for image acquisition so that only light having a wavelength in the infrared region is transmitted. The image acquisition unit 100 may use a polarizing filter in order to reduce reflection of light on a glass surface. This makes use of polarization characteristics of reflected light and consequently reduces the influence of environment information reflected in a glass surface of the vehicle on detection.

The images acquired by the image acquisition unit 100 are provided to the person detection unit 103 and the specific-part detection unit 101.

The specific-part detection unit 101 detects a specific part of a vehicle, such as a wheel, in the image acquired by the image acquisition unit 100 and provides, to the association unit 102, a specific-part detection result including information indicating, for example, the coordinate values of the detected specific part. The specific part of the vehicle may be any part that is characteristic as a specific part of a vehicle, such as a window frame, a door of a vehicle, a tail lamp, or a side-view mirror, instead of a wheel. For example, a vehicle registration plate or a lamp may be detected in the image acquired by a camera configured to capture images from the front of a vehicle. The specific-part detection unit 101 generates, as a specific-part detection result, position information of the detected specific part and information related to the position information (e.g., in the case of a wheel, information indicating whether the wheel is a front wheel or a rear wheel) and provides the specific-part detection result to the association unit 102.

The association unit 102 associates the specific-part detection results with each other of the images provided by the specific-part detection unit 101 and calculates the movement amounts of the vehicle and the positions of the vehicle in the images. The association unit 102 may carry out this association for each two sequential images or for multiple images in bulk.

When the association unit 102 carries out association for each two sequential images, the association unit 102 takes account of the traveling direction of the vehicle. For example, the association unit 102 checks, in the image, whether the specific part is detected in the traveling direction from the position at which the specific part is detected in the previous image, based on the specific-part detection results. In this way, the association unit 102 obtains the specific parts in the previous image and the current image to be associated with each other.

In this exemplary embodiment, the angle of camera view is fixed. Hence, it is possible for the association unit 102 to estimate the direction (path) in which the specific part moved in the images. With the estimation, the association unit 102 checks, in the next image, whether the detection result of the specific part exists in the estimated direction and carries out the association accordingly. The direction in which the specific part moves at respective positions in the images may be manually provided. Alternatively, the association unit 102 may carry out association for the images on the basis of images of a vehicle captured while the vehicle was traveling slowly in a test run, and may acquire the direction in which the specific part moves at respective positions in the images. Any of various methods may be employed as an images association method, for example, template matching for each partial area or a method of calculating a local feature value, such as scale-invariant feature transform (SIFT) feature, and associating the feature values with each other.

In contrast, when the association unit 102 carries out association for multiple images in bulk, the association unit 102 establishes in advance a model of a path in which the specific part moves in images, on the basis of the direction of the camera and the traveling direction of the vehicle. The association unit 102 associates specific-part detection results with each other, the specific-part detection results having the best match on the assumption that the vehicle moves at a constant speed using the model, and thereby calculates the movement amount between the images.

Figure 2:
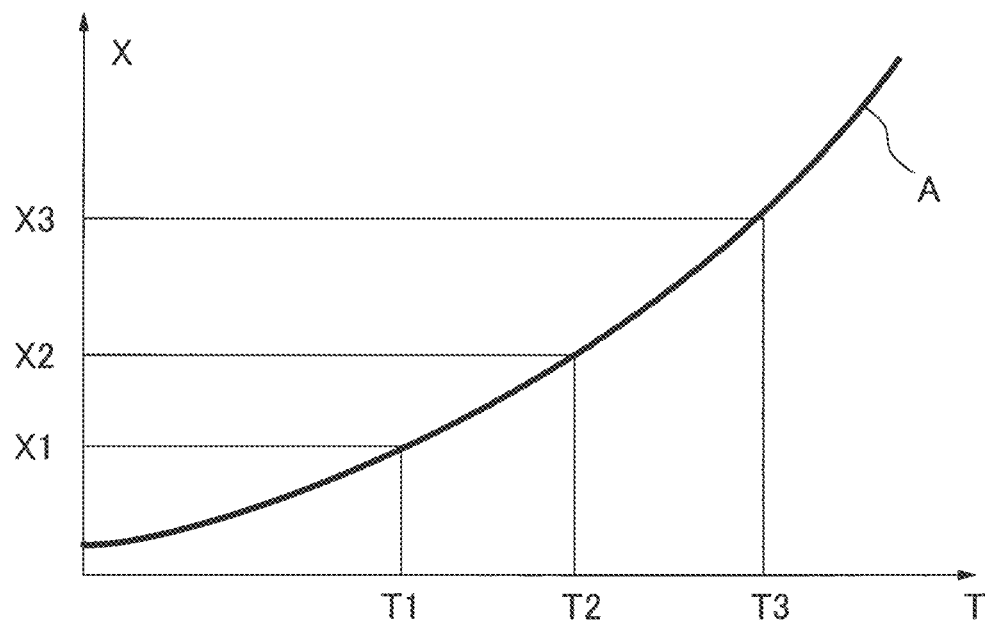
FIG. 2 is a graph illustrating an example of the relationship between coordinate values of specific parts and time points in the case where images of a vehicle are captured from a side of the vehicle and the vehicle moves at a constant speed.

FIG. 2 is a graph illustrating an example of the relationship between coordinate values of specific parts and time points in the case where a vehicle moves at a constant speed and images of the vehicle are captured from a side of the vehicle. Here, each coordinate value is an X-axis direction coordinate value in an X-Y coordinate system where the direction parallel with the ground is the X axis and the direction vertical with respect to the ground is the Y axis in a vehicle captured image. FIG. 2 presents an example of the relationship between coordinate values of specific parts and time points in the case where a vehicle moves at a constant speed, when the relationship does not form a straight line due to an influence of distortion of a camera lens or the like. For example, assume that there are multiple images of a vehicle captured while the vehicle was moving at a constant speed. When the relationship between time points "T" and X-axis direction coordinate values "X" of specific parts at respective time points "T" in the images corresponds to the relationship as that depicted as "A" in FIG. 2, the association unit 102 carries out association to be described below for the images. In this case, specific parts having respective detected X-axis direction coordinate values "X1", "X2", and "X3" are given as specific-part candidates to be possibly associated with each other, and it is determined as described below whether the specific parts of the images are to be associated with each other. FIG. 2 is a graph illustrating that the relationship between the time points "t" and the X-axis direction coordinate values "X" of the specific parts at the respective time points "t" is shown by "A", and the vertical axis "T" as well as "T1", "T2", and "T3" indicate relative time points to be described later.

First, on the basis of the X-axis direction coordinate values "X1", "X2", and "X3" of the specific parts detected at the respective time points "t1", "t2", and "t3" and the relationship depicted as "A" in FIG. 2, the association unit 102 obtains corresponding time points (referred to as "relative time points" below) T, i.e., "T1", "T2", and "T3". When linear uniform motion is assumed, a linear relationship is established between "T1", "T2", and "T3" and "t1", "t2", and "t3". For this reason, the association unit 102 can determine whether the specific parts are to be associated with each other by determining whether linear approximation is possible. In this way, it is possible to determine whether the specific parts having the above detected coordinate values are to be associated with each other, on the basis of the relationship between "T1", "T2", and "T3" and "t1", "t2", and "t3". Specifically, the association unit 102 finds a regression line and obtains specific-part detection results close to the regression line, and can thereby associate the specific parts of the images with each other. In this case, the detection results may include false detection. By taking this into account, the association unit 102 finds a regression line by use of a robust statistical method, such as random sample consensus (RANSAC). The association unit 102 may then determine whether the association is possible, on the basis of the distance of each result from the straight line. Specifically, the association unit 102 carries out association in images on the assumption that specific parts each having a distance within a threshold value from the straight line are to be associated with each other. Alternatively, the association unit 102 may find a straight line approximating the relationship between the time point t and the relative time point T by Hough transform and may carry out a similar process. The case in which a vehicle moves at a constant speed is described above. Alternatively, a constant acceleration model or the like may be used instead. When a constant acceleration model is used, a quadric relationship is established between "t1", "t2", and "t3" and "T1", "T2", and "T3". Accordingly, the association unit 102 can carry out association through quadratic-function fitting.

The association unit 102 outputs the movement amounts calculated between the images and the position information of the vehicle, as vehicle movement information, to the integration unit 104.

Figure 3:
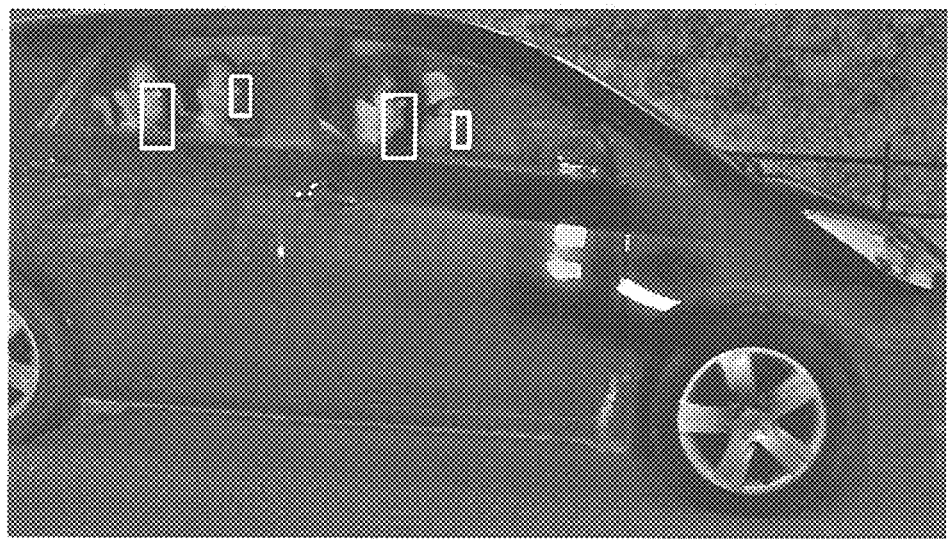
FIG. 3 is a picture illustrating a state where occupants are detected in an image captured by a camera capturing images from a side of a vehicle.
Figure 4:
FIG. 4 is a picture illustrating a state where occupants are detected in an image captured by a camera capturing images from front of a vehicle.

The person detection unit 103 detects one or more occupants of the vehicle in the images. FIG. 3 is a picture illustrating a state where occupants are detected in an image captured from a side. FIG. 4 is picture illustrating a state where occupants are detected in an image captured from front. For example, when an image of the faces of passengers is captured at such an angle as to see the faces almost from a side as presented in FIG. 3, the person detection unit 103 can detect the occupants by use of a detector for faces seen from a side. In contrast, when an image of the faces of passengers is captured at such an angle as to see the faces almost from front as presented in FIG. 4, the person detection unit 103 can detect the occupants by use of a detector for faces seen from front. Such detectors can be configured through learning using a number of face images captured from a side and front. As such a detector, a support vector machine (SVM), a linear discriminant analysis (LDA), or generalized learning vector quantization (GLVQ) may be used, for example.

The person detection unit 103 provides, to the integration unit 104, position information indicating the position of each detected person in each image together with information identifying the image (e.g., time information of the image or image number), as a person detection result. In this exemplary embodiment, rectangle information indicating the position (range) of the head (face) of the detected person in the image is used as position information. In the following description, the rectangle is referred to as "person rectangle". Each white frame in FIG. 3 and FIG. 4 indicates the position (range) of the head of each detected person in the image indicated by rectangle information.

The integration unit 104 estimates the number of passengers by associating the person detection results of the images provided by the person detection unit 103 with each other, on the basis of the vehicle movement information provided by the association unit 102, and then outputs the result of the estimation.

Specifically, the integration unit 104 compensates the movement of the vehicle on the basis of the movement amount included in the vehicle movement information, associates the occupants detected in the respective images with each other, and integrates the person detection results considered to be detection results for the same person. When there are person detection results that are obtained at the same position in the images irrespective of the movement amount, the person detection results are highly likely to be those obtained by false detection of a particular pattern in the background. Accordingly, the integration unit 104 excludes the person detection results detected at the same position in the images, as false detection. A concrete method to be employed for the integration is described later. The integration unit 104 determines the number of passengers from the integration result and outputs the number of passengers.

Next, a concrete configuration and operation of each of the components are described.

First, a configuration of the specific-part detection unit 101 is described.

Figure 5:
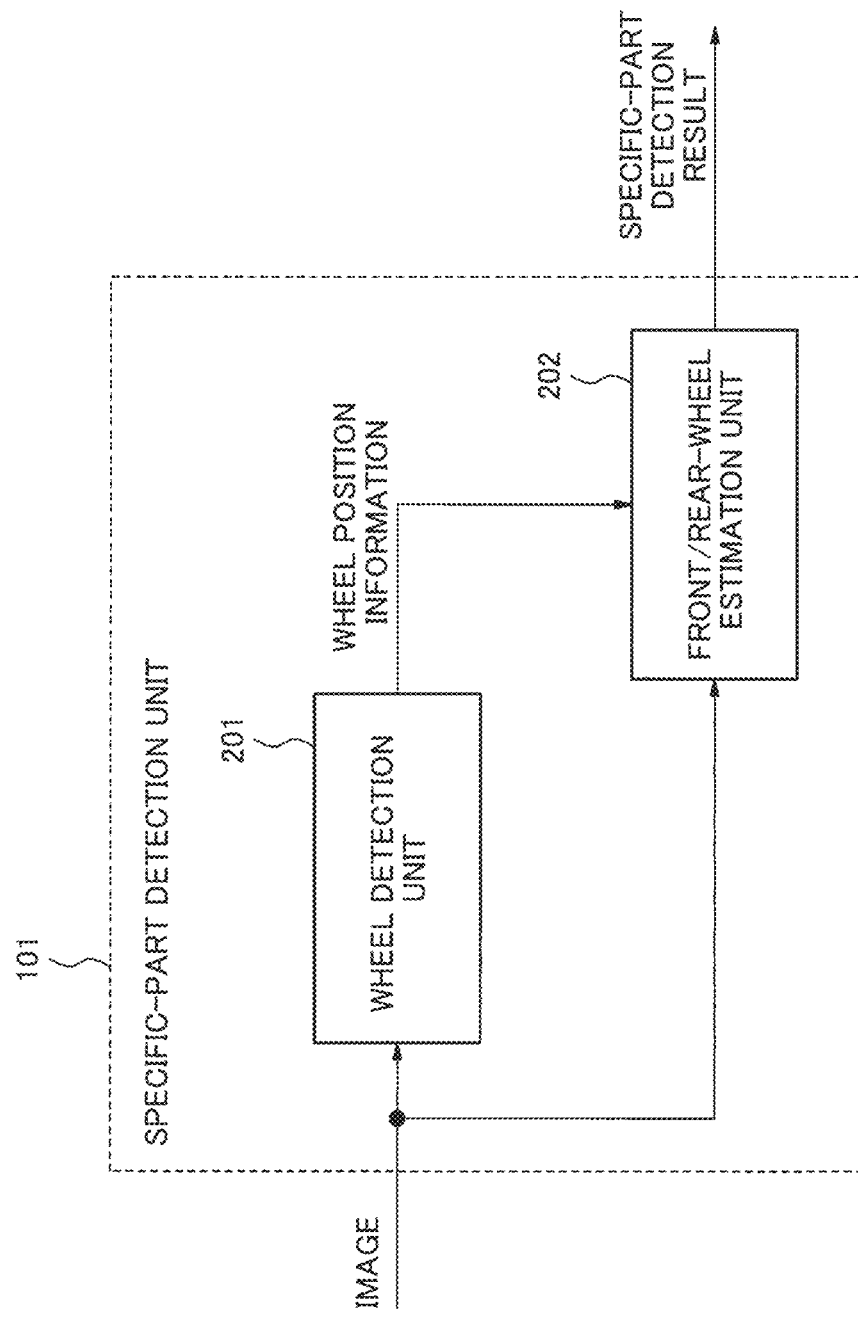
FIG. 5 is a block diagram illustrating an example of a configuration of a specific-part detection unit.

Description is given below by taking, as an example, the specific-part detection unit 101 configured to detect a wheel as a specific part. FIG. 5 is a block diagram illustrating an example of the configuration of the specific-part detection unit 101. As illustrated in FIG. 5, the specific-part detection unit 101 includes a wheel detection unit 201 and a front/rear-wheel estimation unit 202.

The wheel detection unit 201 detects one or more wheel candidates in each provided image and provides position information of each wheel candidate as wheel position information to the front/rear-wheel estimation unit 202.

The front/rear-wheel estimation unit 202 analyzes the provided image on the basis of the wheel position information provided by the wheel detection unit 201 and estimates whether the detected wheel is a front wheel or the rear wheel. The front/rear-wheel estimation unit 202 provides a specific-part detection result including the estimation result to the association unit 102. By the use of the estimation result included in the specific-part detection result, the association unit 102 can associate the corresponding front wheels and rear wheels detected in the images with each other.

The wheel detection unit 201 and the front/rear-wheel estimation unit 202 are implemented, for example, by the CPU of the computer configured to operate in accordance with the passenger counting program. The CPU operates as the wheel detection unit 201 and the front/rear-wheel estimation unit 202 in accordance with the passenger counting program. Alternatively, the wheel detection unit 201 and the front/rear-wheel estimation unit 202 may be implemented by individual hardware units.

Next, operation of the specific-part detection unit 101 is described.

Figure 6:
FIG. 6 is a picture illustrating a state where wheel areas are detected in an image captured by a camera capturing images from a side of a vehicle.

The wheel detection unit 201 detects one or more wheels in each provided image and outputs the detection result. For example, the wheel detection unit 201 detects a wheel by finding a round shape in the image through generalized Hough transform and outputs, for the wheel, the center coordinates, specifically, the position coordinate values of the center of the wheel in the image, and the value of the radius of the wheel, as wheel position information. FIG. 6 is a picture illustrating a state where wheel areas are detected in an image captured from a side. In FIG. 6, each part surrounded by a white circle is an area detected as a wheel. The wheel detection unit 201 may obtain a circumscribed rectangle of each wheel area and output information describing the circumscribed rectangle (e.g., information indicating the values of the upper left coordinates and the width and height of the rectangle) as wheel position information. When multiple wheel candidate areas are detected, the wheel detection unit 201 may output multiple wheel candidate areas.

As is described later, the front/rear-wheel estimation unit 202 obtains edge features and gradient features of an area near the wheel on the basis of the wheel position information output by the wheel detection unit 201. The front/rear-wheel estimation unit 202 determines whether the detected wheel area is more likely to correspond to a front or rear wheel, on the basis of the obtained edge features and gradient features. The front/rear-wheel estimation unit 202 calculates the likelihoods indicating the likelihood of being a front wheel and the likelihood of being a rear wheel (referred to as likelihoods of being a front and a rear wheel below) and outputs the calculation results, together with the wheel position information, as a specific-part detection result.

Next, a configuration of the front/rear-wheel estimation unit 202 is described.

Figure 7:
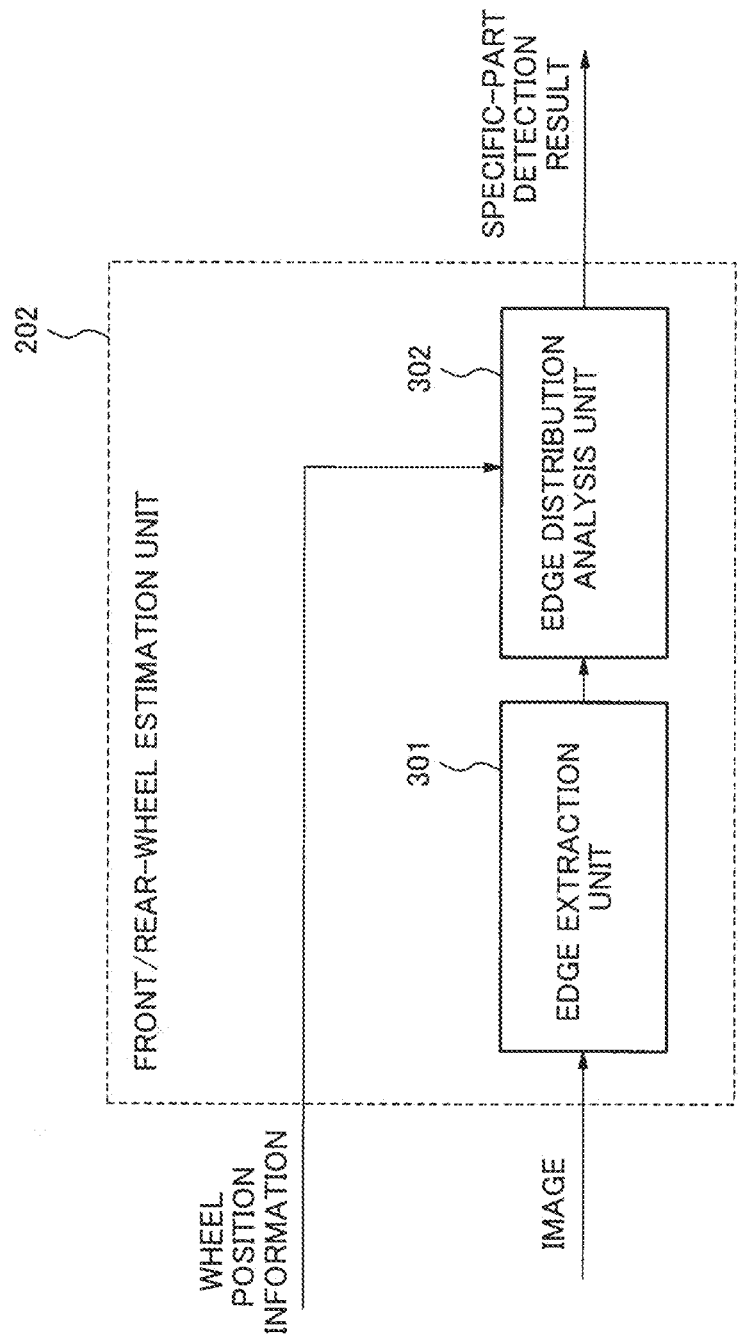
FIG. 7 is a block diagram illustrating an example of a configuration of a front/rear-wheel estimation unit.

FIG. 7 is a block diagram illustrating an example of a configuration of the front/rear-wheel estimation unit 202. As illustrated in FIG. 7, the front/rear-wheel estimation unit 202 includes an edge extraction unit 301 and an edge distribution analysis unit 302.

The edge extraction unit 301 generates edge information from the provided image and also provides the generated edge information to the edge distribution analysis unit 302. The edge information is information indicating edge features extracted from the image.

The edge distribution analysis unit 302 determines, for the wheel area, whether the wheel area corresponds to a front wheel or a rear wheel, on the basis of the edge information output by the edge extraction unit 301 and the wheel position information and outputs the result, together with the wheel position information, as a specific-part detection result.

The edge extraction unit 301 and the edge distribution analysis unit 302 are implemented, for example, by the CPU of the computer configured to operate in accordance with the passenger counting program. The CPU operates as the edge extraction unit 301 and the edge distribution analysis unit 302 in accordance with the passenger counting program. Alternatively, the edge extraction unit 301 and the edge distribution analysis unit 302 may be implemented by individual hardware units.

Next, operation of the front/rear-wheel estimation unit 202 is described.

Figure 8:
FIG. 8 is a picture illustrating edges in the image presented in FIG. 3.

The edge extraction unit 301 extracts edge information. The edge extraction unit 301 obtains the luminance gradient by use of, for example, Sobel operator, from the provided image and extracts, as edge features, pixels each having an absolute value of the luminance gradient larger than or equal to a certain value. The edge extraction unit 301 sets the gradient direction and the gradient value of the luminance gradient as edge information. The edge extraction unit 301 may set the luminance gradient features as edge information. Alternatively, the edge extraction unit 301 may obtain straight-line segment information through probabilistic Hough transform or the like, set points on a line segment as edge points, and extract the direction of the edge points as edge information. The edge extraction unit 301 may employ any method other than the above as long as the method can extract edge features. FIG. 8 is a picture illustrating edges in the image presented in FIG. 3. The white pixels presented in FIG. 8 are pixels determined as edges.

The edge extraction unit 301 provides the extracted edge information to the edge distribution analysis unit 302.

The edge distribution analysis unit 302 calculates statistics of edge components in an area near the wheel in the image, on the basis of the edge information and calculates the likelihoods indicating the likelihoods of being a front and a rear wheel. The area near each wheel is an area within a predetermined range from the area indicating the wheel. For example, the edge distribution analysis unit 302 obtains the histogram of the edge direction components. The edge distribution analysis unit 302 analyzes the histogram with respect to direction and thereby determines the likelihoods of being a front and a rear wheel. In this operation, the edge distribution analysis unit 302 may generate, while taking account of the intensities of the edges (e.g., the degrees of the gradients), a histogram by weighting the components with the intensities.

When an image of a vehicle moving toward the right is captured from a side as illustrated in FIG. 8, an upper part of a front wheel corresponds to a part near the windshield of the vehicle. Since the windshields of vehicles are installed in a manner inclined obliquely toward the rear in order to let the wind to flow, there are many line segments extending from the upper left to the lower right in an upper area of a front wheel. Since the normal direction of each of such line segments serves as an edge direction, this area includes many edges in the normal directions. In contrast, since there are many line segments extending from the upper right to the lower left in an upper area of a rear wheel, this area includes many edges in directions different from those for a front wheel.

In this way, the edge distribution analysis unit 302 analyzes the directional properties of the edges on the basis of the histogram of the edge direction components and determines whether the wheel area corresponds to a front wheel or a rear wheel. For example, when particular oblique-direction component indicates a value exceeding a threshold value in the histogram, the edge distribution analysis unit 302 may determine that the wheel area corresponds to a front wheel, or a rear wheel. The edge distribution analysis unit 302 does not need to conclusively determine whether the wheel area corresponds to a front wheel or a rear wheel. In other words, the determination result does not always need to take one of two values one of which indicates that the wheel area corresponds to a front wheel and the other of which indicates that the wheel area corresponds to a rear wheel. For example, the edge distribution analysis unit 302 may stochastically determine whether the wheel area corresponds to a front wheel or a rear wheel, in the form of, for example, the likelihoods of being a front and a rear wheel. In this case, a result to be output includes the score (likelihood) indicating the likelihood of being a front wheel and the score (likelihood) indicating the likelihood of being a rear wheel. Here, a larger likelihood is a value indicating a higher probability.

In the above example, a method of obtaining the distribution of edge components and analyzing the distribution heuristically is described. However, these may be automatically identified by way of learning. For example, the edge feature values in an area near a front wheel and an area near a rear wheel are input and learnt in advance by use of a number of images. With the feature values, a discriminator configured to output a score (likelihood) indicating the likelihoods of being a front and a rear wheel is established, and determination is carried out by the discriminator. As the discriminator, a neural network may be used, for example.

The edge distribution analysis unit 302 outputs likelihood information indicating the calculated likelihoods of being a front and a rear wheel, together with the provided wheel position information, as a specific-part detection result.

In FIG. 7, wheel position information is not provided to the edge extraction unit 301. However, wheel position information may be provided to the edge extraction unit 301. The edge extraction unit 301 may carry out edge extraction by limiting the area for which edge extraction is to be carried out to an area near each wheel, on the basis of the wheel position information. For example, the edge extraction unit 301 may obtain edge information only within a certain area above a wheel which serves as a target area of edge extraction. Such a configuration can reduce time and the like required for edge extraction.

In the above, description is given of a method of conclusively or stochastically determining whether a wheel area corresponds to a front or a rear wheel and including the determination result in a specific-part detection result. However, even without information on a front and a rear wheel, it is possible to determine whether a wheel area corresponds to a front or a rear wheel, at the stage of the association unit 102 associating specific-part detection results of images with each other. Specifically, the association unit 102 may group wheels in images likely to be associated with each other, according to the relationship between the positions of the wheels and time points, and determine whether the wheels correspond to a front or a rear wheel, on the basis of the positional relationship of the group.

Next, a configuration of the integration unit 104 is described.

Figure 9:
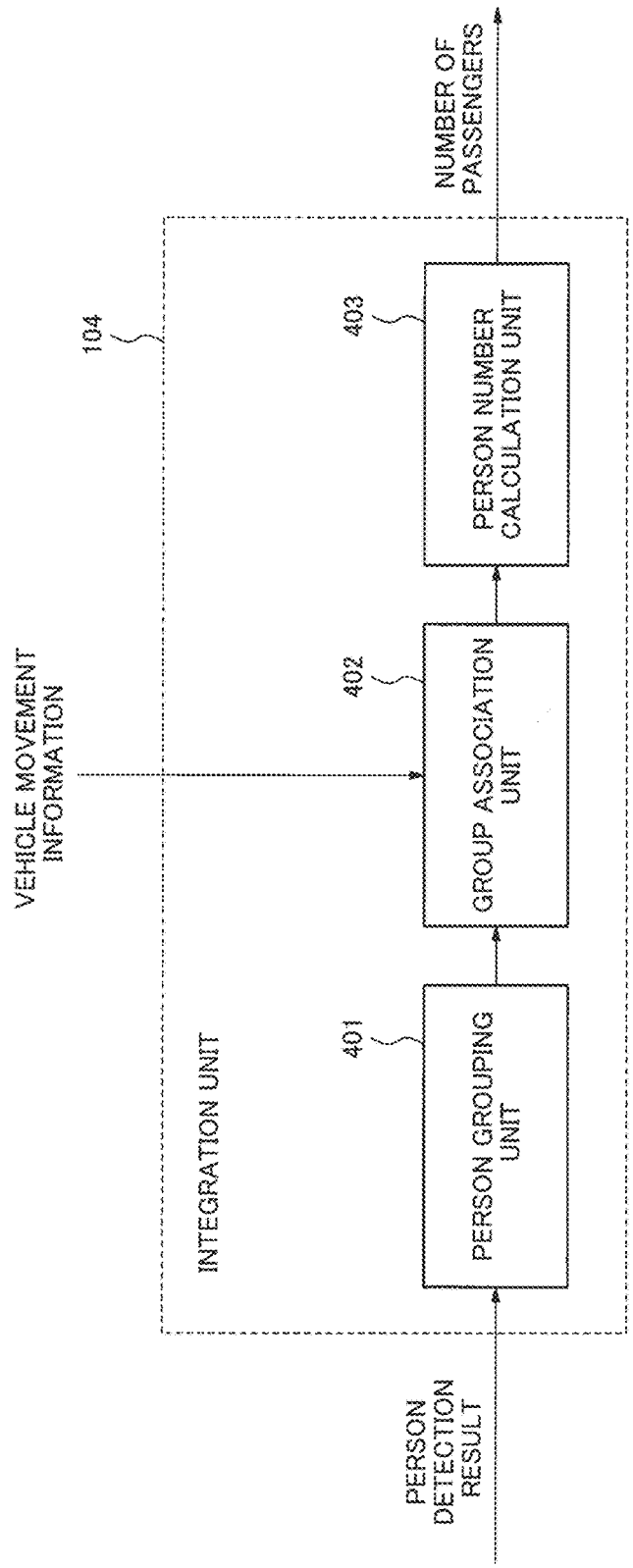
FIG. 9 is a block diagram illustrating an example of a configuration of an integration unit.

FIG. 9 is a block diagram illustrating an example of the configuration of the integration unit 104. As illustrated in FIG. 9, the integration unit 104 includes a person grouping unit 401, a group association unit 402, and a person number calculation unit 403.

The person grouping unit 401 groups person detection results for the images. This process corresponds to grouping persons in each of the row of the front seats and the row of the rear seats of a vehicle.

The group association unit 402 compensates for the movement of the vehicle between the images on the basis of the vehicle movement information and associates person grouping results provided by the person grouping unit 401.

The person number calculation unit 403 estimates the number of persons for the groups of the images associated with each other. Further, the person number calculation unit 403 calculates the number of passengers by adding together the person number estimation results for the groups.

The person grouping unit 401, the group association unit 402, and the person number calculation unit 403 are implemented, for example, by the CPU of the computer configured to operate in accordance with the passenger counting program. The CPU operates as the person grouping unit 401, the group association unit 402, and the person number calculation unit 403 in accordance with the passenger counting program. The person grouping unit 401, the group association unit 402, and the person number calculation unit 403 may be implemented by individual hardware units.

Next, operation of the integration unit 104 is described.

The person detection unit 103 provides person detection results to the person grouping unit 401.

The person grouping unit 401 groups the person detection results in the images. Specifically, on the basis of position information included in each of the person detection results, the person grouping unit 401 groups the person detection results for the persons located at positions close to each other, each position being indicated by the position information, as belonging to the same group. Positions close to each other, each position being indicated by the position information, means, for example, that the distance between center coordinate values of rectangles indicating the heads (faces) of respective detected persons are positioned within a predetermined range in the image. In particular, the positions of detected persons in each row of the seats of a vehicle (such as front seats or rear seats) are close to each other in an image captured by a camera capturing images from a side of a vehicle, hence being able to group the results highly accurately. In an image captured by a camera capturing images from a side of a vehicle, the positions at which the profiles of persons seated in the same row are detected are almost side by side as presented in FIG. 3. In consideration of this, the person grouping unit 401 may group the results only by using the X-axis direction (horizontal direction with respect to the ground in FIG. 3) coordinate value in the rectangle information indicating each detected profile. Rectangle information having a Y-axis direction (vertical direction with respect to the ground in FIG. 3) value largely different from the others highly likely results from fault detection and may hence be excluded from grouping.

The person grouping unit 401 provides, to the group association unit 402, position information of each obtained person rectangle and information indicating, for each person rectangle, the group to which the person rectangle belongs, as person grouping information. An area surrounding all the person rectangles belonging to a group is referred to as "person group area" below.

In an image captured by a camera capturing images from front, however, a face of a person seated in a rear seat appears between the driver's seat and the passenger seat in some cases as presented in FIG. 4. In this case, simple grouping based on positions as described above is not suitable to employ. Instead, the person grouping unit 401 carries out grouping in this case by taking account of, for example, the positional relationship between faces located side by side, the fact that the driver's seat and the passenger seat are apart from each other to some extent or the fact that a face at a front seat is larger than that at a rear seat in an image. Such grouping is possible, for example, by adding a constraint that faces positioned close to each other to a certain extent or more are not allowed to be included in the same group or by calculating, at the time of clustering, distances in consideration of the sizes of faces as a feature in addition to face detection positions.

The group association unit 402 carries out, for the corresponding person group areas obtained for the respective image, motion compensation according to the movement amount included in the vehicle movement information, and associates the person group areas with each other. For example, the group association unit 402 associates, with each other, groups having center coordinates of the person group areas in the images close to each other. In this way, association information indicating, for each group in each image, the groups of different images with which the group is associated, for example, is obtained. When the vehicle movement information includes information on the position of a specific part of a vehicle, such as the position of a wheel, the group association unit 402 compares the position of the specific part and the position of the corresponding groups to obtain the row to which the groups correspond, and generates association information. When the vehicle movement information does not include information on the position of a specific part of a vehicle, the group association unit 402 determines the row to which a person group corresponds, such as the person group at the front seats or the person group at the rear seats, on the basis of the relative position relationship between the groups. The group association unit 402 provides the association information to the person number calculation unit 403.

The person number calculation unit 403 obtains the number of persons in each row on the basis of the association information and calculates the number of passengers by adding up the numbers of persons in the rows. In this operation, the person number calculation unit 403 obtains the largest number for the groups associated with each other and sets the largest number as the number for the corresponding row. When the degree of ease at which persons are detected is different according to the position in an image due to the state of how the persons are exposed to light from a projector or the like, the person number calculation unit 403 may stochastically calculate the number of persons in consideration of the difference. Specifically, the person number calculation unit 403 may weight the determination result about the number of persons at each position, according to the degree of ease at which the persons are detected, calculate the weighted average, and thereby calculate the number of persons in each row. The person number calculation unit 403 calculates the number of passengers by adding up the numbers of persons obtained for the respective rows. In this operation, the person number calculation unit 403 may carry out weighted addition by taking account of the degree of ease at which persons in each row are detected. For example, the person number calculation unit 403 carries out weighted addition by taking account of the fact that it is difficult to detect persons seated in the rear seats compared to those seated in the front seats due to, for example, window tinting.

As described above, in this exemplary embodiment, person detection results from multiple images are associated with each other, the person detection results for respective images are integrated, and the number of passengers is determined. In this way, the number of passengers including persons seated in the rear seats can be counted. In this process, in particular, a specific part of a vehicle is detected, the results of the detection in images are associated with each other, and the movement amount is obtained. Hence, the movement amount between the positions of the persons in the images can be accurately estimated, consequently increasing the accuracy of association of the person detection results in the images and thereby increasing the accuracy of the estimated number of persons.

Exemplary Embodiment 2

A second exemplary embodiment of the present invention is described below with reference to the drawings.

Figure 10:
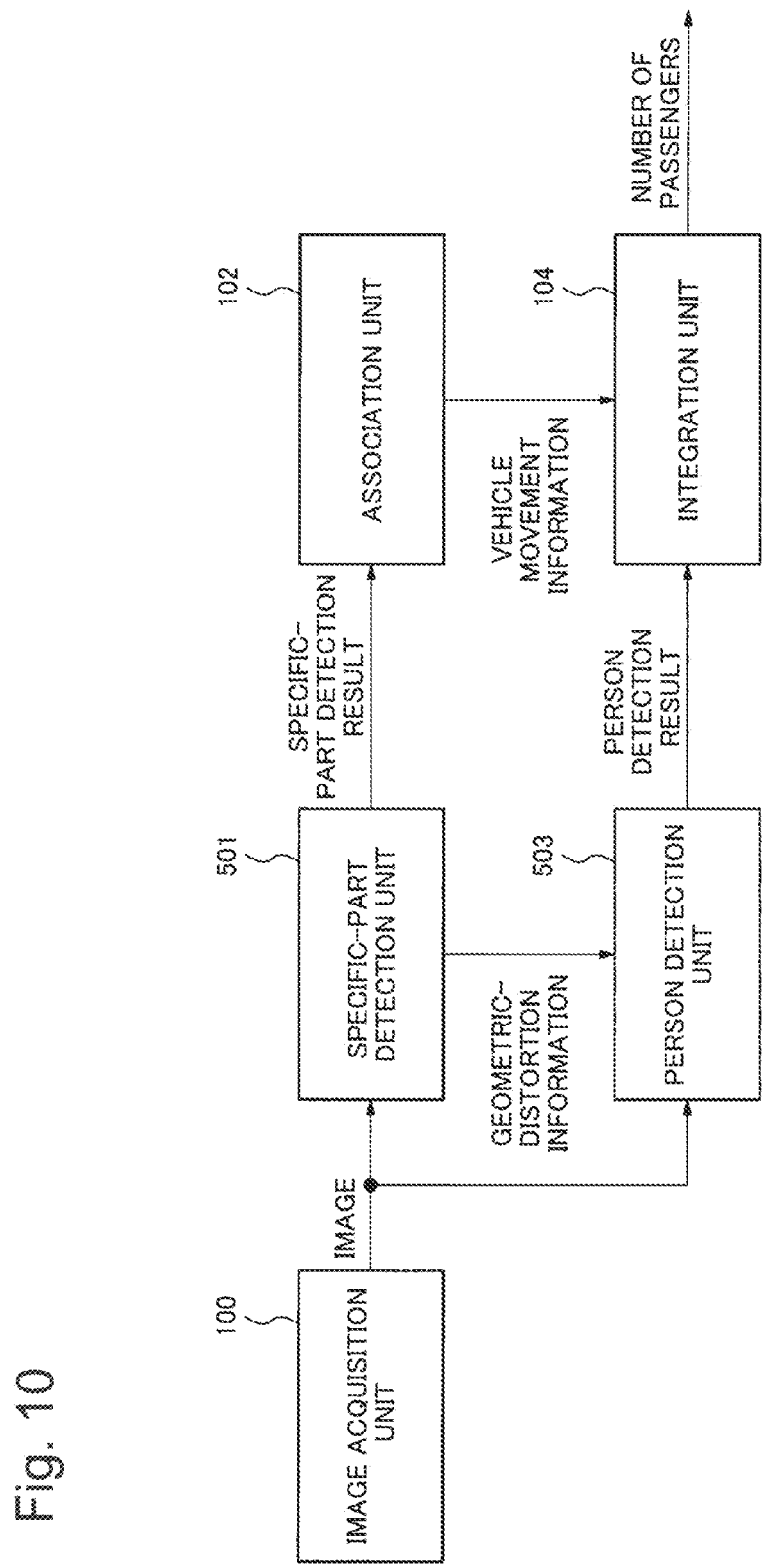
FIG. 10 is a diagram illustrating a configuration of a passenger counting device according to a second exemplary embodiment of the present invention.

FIG. 10 is a diagram illustrating a configuration of the second exemplary embodiment of the passenger counting device according to the present invention. As illustrated in FIG. 10, the passenger counting device according to this exemplary embodiment includes an image acquisition unit 100, a specific-part detection unit 501, the association unit 102, a person detection unit 503, and the integration unit 104.

In this exemplary embodiment, the passenger counting device includes the specific-part detection unit 501 instead of the specific-part detection unit 101 illustrated in FIG. 1. In addition, the passenger counting device includes the person detection unit 503 instead of the person detection unit 103 illustrated in FIG. 1.

The specific-part detection unit 501 detects a specific part of a vehicle in an image output from the image acquisition unit 100, provides the specific-part detection result to the association unit 102, and also provides information on geometric distortion (referred to as geometric-distortion information, below) to the person detection unit 503.

The person detection unit 503 detects one or more persons in the image provided by the image acquisition unit 100, on the basis of the corresponding geometric-distortion information provided by the specific-part detection unit 501, and outputs the person detection result(s) to the integration unit 104.

The other part of the configuration of the second exemplary embodiment is the same as that of the first exemplary embodiment.

Next, operation in this exemplary embodiment is described.

The image acquisition unit 100 outputs a captured image to the specific-part detection unit 501.

The specific-part detection unit 501, as the specific-part detection unit 101 in the first exemplary embodiment, detects a specific part of a vehicle in the image captured by the image acquisition unit 100. At the same time, the specific-part detection unit 501 obtains geometric-distortion information on the basis of a distortion value of the specific part.

Figure 11:
FIG. 11 is a picture illustrating an example of an image of a vehicle captured by a rolling-shutter camera from a side of the vehicle.

FIG. 11 is a picture illustrating an example of an image captured by a rolling-shutter camera capturing images of a vehicle from a side. For example, when a camera with a rolling shutter is used, distortion occurs in an image, as presented in FIG. 11, due to an influence of the speed of the vehicle. When the rolling shutter is used, pixels in lines are sequentially exposed from the top. Accordingly, the time point at which the pixels in a line at the bottom are exposed is later than that for a line at the top. If the vehicle, which is an object, moves during the exposure, the position of the vehicle shifts forward more largely as the position becomes lower in an image, consequently causing the vehicle to be obliquely inclined in the image as presented in FIG. 11. The deviation depends on the speed of the vehicle; the higher the speed is, the larger the deviation becomes. This applies also to the specific part of the vehicle. For this reason, the specific-part detection unit 501 can determine the approximate speed at which the vehicle moves, from the degree of geometric distortion of the specific part of the vehicle. The specific-part detection unit 501 can find the deviation value on the basis of the position of the Y-axis (vertical direction with respect to the ground in the image presented in FIG. 11).

For example, when the specific part is a wheel, the wheel is obliquely inclined in an image and appears in an elliptic form. Accordingly, the specific-part detection unit 501 performs ellipse fitting to obtain the inclination of the long axis. With the inclination, the specific-part detection unit 501 can calculate the deviation value with respect to the position of the Y axis. When the specific part is a door of the vehicle, the specific-part detection unit 501 calculates the deviation value of the vertical edge of the door from the vertical direction with respect to the ground. Through this calculation, the specific-part detection unit 501 can estimate the deviation value with respect to the Y axis.

The specific-part detection unit 501 provides the information thus calculated, as geometric-distortion information to the person detection unit 503.

The image acquired by the image acquisition unit 100 is provided also to the person detection unit 503. The person detection unit 503 corrects the provided image on the basis of the geometric-distortion information output by the specific-part detection unit 501. The person detection unit 503 then carries out person detection for the corrected image. For example, when a rolling-shutter camera is used, the person detection unit 503 corrects the image in terms of the lateral deviation value changing according to the coordinate position in the vertical direction with respect to the ground on the basis of the geometric-distortion information and then carries out a process of person detection such as profile detection. This largely improves the accuracy of person detection compared to the case of not correcting distortion.

The person detection unit 503 may switch between person detection modes according to the degree of geometric distortion, instead of performing correction on images. As described above, when a rolling-shutter camera is used, a person included in a provided image tends to be obliquely inclined to a greater extent as the speed of the vehicle increases. In such a case, where a person included in a provided image is obliquely inclined, a person detector which has carried out learning by the use of images each including an inclined object may be used. Specifically, a value of oblique inclination of a person is estimated on the basis of the geometric-distortion information, and person detection is carried out by switching between detectors (or dictionary information to be used for detection) according to the estimation. In this case, as in the above-mentioned case, the detection accuracy can be largely improved compared to the case of not correcting distortion.

The person detection unit 503 may correct distortion also when images are distorted largely due to a lens (lens distortion). In this case, the specific-part detection unit 501 obtains the lens distortion at each position of the image and provides, to the person detection unit 503, distortion information indicating the positional relationship between the distortion and a specific part. The person detection unit 503 corrects the image on the basis of the distortion information. In this case, the person detection unit 503 does not need to directly use the input distortion information. For example, the person detection unit 503 may use the positional relationship between the distortion and the specific part indicated by the distortion information that has been stored, to calculate the distortion in the target area of person detection and perform correction on the image. Specifically, the person detection unit 503 stores distortion information every time the process of person detection is carried out and calculates a distortion parameter that approximates the distortion at each position of the image on the basis of the stored distortion information. After the calculation of the distortion parameter, the person detection unit 503 uses the distortion parameter to correct the distortion of the image and carry out person detection.

The information on the person thus detected is output to the integration unit 104 as a person detection result, as in the first exemplary embodiment.

The other part of the operation of the second exemplary embodiment is the same as that of the first exemplary embodiment.

As described above, in this exemplary embodiment, the passenger counting device carries out person detection by taking account of distortion occurring in the image and can therefore count the number of persons more accurately.

Third Exemplary Embodiment

Figure 12:
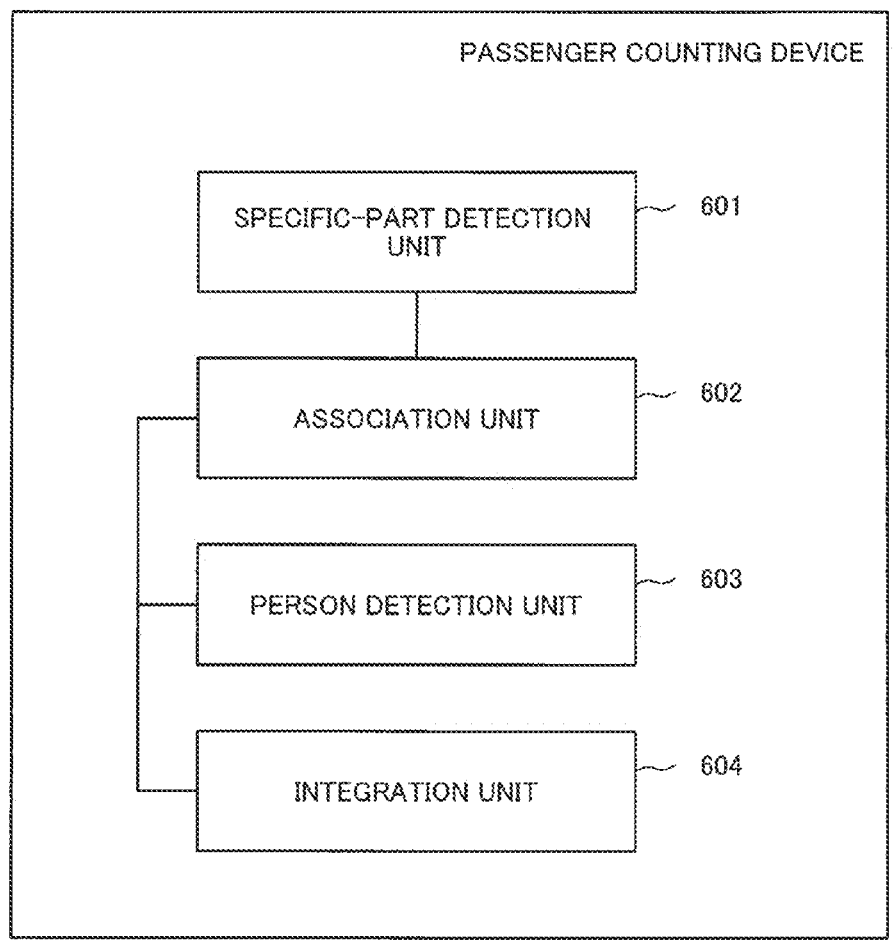
FIG. 12 is a diagram illustrating a configuration of a passenger counting device according to a third exemplary embodiment of the present invention.

FIG. 12 is a block diagram illustrating a configuration of a third exemplary embodiment of the passenger counting device according to the present invention. As illustrated in FIG. 12, the passenger counting device of this exemplary embodiment includes a specific-part detection unit 601, an association unit 602, a person detection unit 603, and an integration unit 604.

The specific-part detection unit 601 detects a specific part of a vehicle in the acquired image and generates a specific-part detection result. The association unit 602 calculates the movement amount of the vehicle by associating the specific-part detection results of the images and generates vehicle movement information including the calculation result.

The person detection unit 603 detects one or more occupants of the vehicle in the image and generates a person detection result(s) including position information of the detected occupant. The integration unit 604 integrates the person detection results on the basis of vehicle movement information and thereby determines the number of passengers.

According to the third exemplary embodiment, the passenger counting device with the above-described configuration can accurately count the number of passengers including those seated in the rear seats.

Figure 13:
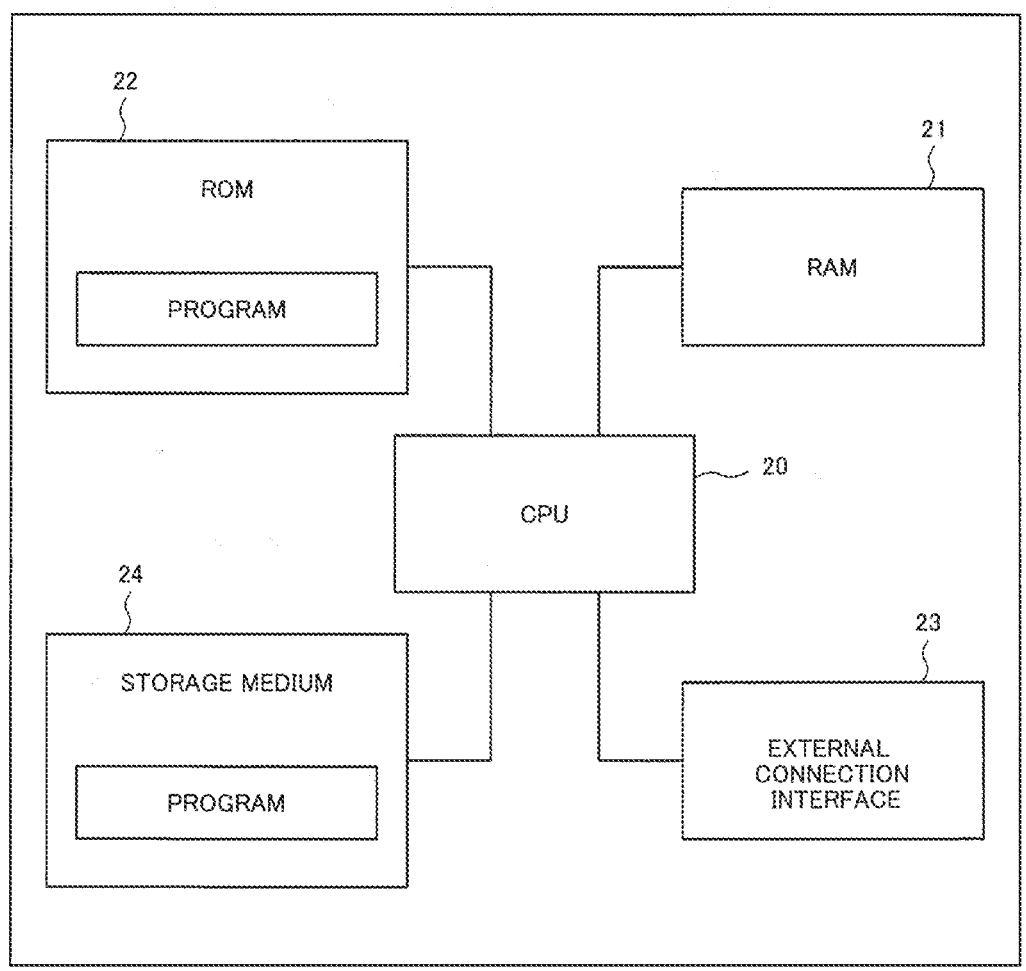
FIG. 13 is a diagram illustrating an example of a hardware configuration of the passenger counting device according to each of the exemplary embodiments of the present invention.

In addition, the respective components of the passenger counting device illustrated in FIG. 1 and FIG. 11 are achieved by hardware resources exemplary illustrated in FIG. 13. More specifically, a configuration illustrated in FIG. 13 includes a CPU 20, a RAM (Random Access Memory) 21, a ROM (Read Only Memory) 22, an external connection interface 23, and a storage medium 24. The CPU 20 reads various software programs (computer programs) stored in the ROM 22 or the storage medium 24, and writes the software programs in the RAM 21 and executes the software programs to manage the entire operation of the passenger counting device.

In addition, in the above-described respective exemplary embodiments, as an example in which the CPU 20 illustrated in FIG. 13 executes the function illustrated in the respective blocks in the passenger counting device illustrated in FIG. 1 and FIG. 12, the case of being achieved by a software program has been described. However, a part or all of functions illustrated in the respective blocks illustrated in FIG. 1 and FIG. 12 may be achieved as hardware.

A computer program capable of achieving the above described functions is supplied to the passenger counting device, and then, the CPU 20 writes the computer program in the RAM 21 and executes the computer program, so that the present invention described using the respective exemplary embodiments as examples is achieved.

In addition, the foregoing supplied computer program may be stored in a computer-readable storage device, such as a readable and writable memory (temporary storage medium) or a hard disk device. In this case, it can be thought that the present invention is configured by a code representing the foregoing computer program or a recording medium storing the foregoing computer program.

Heretofore, the invention of the present application has been described with reference to the exemplary embodiments, but the invention of the present application is not limited to the above-described exemplary embodiments. With respect to the configuration and details of the invention of the present application, various changes which those skilled in the art can understand may be made within the scope of the invention of the present application.

INDUSTRIAL APPLICABILITY

A result obtained by counting the number of passengers described above can be used for, for example, automatic determination about a vehicle allowed to use a high occupancy vehicle (HOV) lane, counting of the number of visitors in a theme park while the visitors remain seated or the like, and automatic detection of vehicles overloaded with passengers.

This application is based upon and claims the benefit of priority from Japanese Patent Application No. 2013-212249 filed on Oct. 9, 2013, the entire disclosure of which is incorporated herein.

REFERENCE SIGNS LIST

100 image acquisition unit
101, 501 specific-part detection unit
102 association unit
103, 503 person detection unit
104 integration unit
201 wheel detection unit
202 front/rear-wheel estimation unit
301 edge extraction unit
302 edge distribution analysis unit
401 person grouping unit
402 group association unit
403 person number calculation unit

What is claimed is:

1. A passenger counting device comprising:
   a memory storing instructions; and
   at least one processor configured to process the instructions to:
     detect a specific part of a vehicle in an image and generating specific-part detection results;
     calculate a movement amount of the vehicle by associating the specific-part detection results with each other in images, and generating vehicle movement information including a result of the calculation;
     detect a person who is a passenger, in the images and generating person detection results including position information of the detected person; and
     integrate the person detection results by associating the images based on the vehicle movement information and thereby determine number of passengers.

2. The passenger counting device according to claim 1, wherein the processor is further configured to process the instructions to:
   detect a wheel of the vehicle as the specific part of the vehicle.

3. The passenger counting device according to claim 2, wherein the processor is further configured to process the instructions to:
   detect the wheel in the acquired image and generating wheel position information indicating a position of the wheel in the image and
   analyze the image based on the wheel position information, estimating whether the detected wheel is a front wheel or a rear wheel of the vehicle, and generating the specific-part detection results including a result of the estimation, and
   associate wheels detected in the images with each other by using the results of the estimation included in the specific-part detection results.

4. The passenger counting device according to claim 3, wherein the processor is further configured to process the instructions to:
   obtain an edge feature or a gradient feature near the detected wheel based on the wheel position information, calculates likelihood that the detected wheel is a front wheel of the vehicle and likelihood that the detected wheel is a rear wheel of the vehicle, based on the edge feature or the gradient feature, and generates the specific-part detection results including a result of the calculation.

5. The passenger counting device according to claim 4, wherein the processor is further configured to process the instructions to:
group the person detection results for persons located at positions close to each other, each of the positions being indicated by the corresponding position information for each of the images, and generating person grouping information indicating a result of the grouping,
generate group association information indicating association between each group in each of the images and a group in each different one of the images, based on the vehicle movement information and the person grouping information, and
determine number of persons seated in seats in each row of the vehicle based on the group association information and calculating number of passengers by integrating the numbers of persons in the respective rows.

6. The passenger counting device according to claim 4, wherein the processor is further configured to process the instructions to:
estimate geometric distortion in the image, and
perform correction on the image based on the estimated geometric distortion and detects a person in the corrected image.

7. The passenger counting device according to claim 3, wherein the processor is further configured to process the instructions to:
group the person detection results for persons located at positions close to each other, each of the positions being indicated by the corresponding position information for each of the images, and generating person grouping information indicating a result of the grouping,
generate group association information indicating association between each group in each of the images and a group in each different one of the images, based on the vehicle movement information and the person grouping information, and
determine number of persons seated in seats in each row of the vehicle based on the group association information and calculating number of passengers by integrating the numbers of persons in the respective rows.

8. The passenger counting device according to claim 3, wherein the processor is further configured to process the instructions to:
estimate geometric distortion in the image, and
perform correction on the image based on the estimated geometric distortion and detects a person in the corrected image.

9. The passenger counting device according to claim 3, wherein the processor is further configured to process the instructions to:
estimate geometric distortion in the image, and
perform correction on the image based on the estimated geometric distortion and detects a person in the corrected image.

10. The passenger counting device according to claim 3, wherein the processor is further configured to process the instructions to:
estimate geometric distortion in the image, and
detect a person in the image by using a person detector corresponding to the estimated geometric distortion.

11. The passenger counting device according to claim 2, wherein the processor is further configured to process the instructions to:
group the person detection results for persons located at positions close to each other, each of the positions being indicated by the corresponding position information for each of the images, and generating person grouping information indicating a result of the grouping,
generate group association information indicating association between each group in each of the images and a group in each different one of the images, based on the vehicle movement information and the person grouping information, and
determine number of persons seated in seats in each row of the vehicle based on the group association information and calculating number of passengers by integrating the numbers of persons in the respective rows.

12. The passenger counting device according to claim 2, wherein the processor is further configured to process the instructions to:
estimate geometric distortion in the image, and
perform correction on the image based on the estimated geometric distortion and detects a person in the corrected image.

13. The passenger counting device according to claim 2, wherein the processor is further configured to process the instructions to:
estimate geometric distortion in the image, and
perform correction on the image based on the estimated geometric distortion and detects a person in the corrected image.

14. The passenger counting device according to claim 2, wherein the processor is further configured to process the instructions to:
estimate geometric distortion in the image, and
detect a person in the image by using a person detector corresponding to the estimated geometric distortion.

15. The passenger counting device according to claim 1, wherein the processor is further configured to process the instructions to:
group the person detection results for persons located at positions close to each other, each of the positions being indicated by the corresponding position information for each of the images, and generating person grouping information indicating a result of the grouping,
generate group association information indicating association between each group in each of the images and a group in each different one of the images, based on the vehicle movement information and the person grouping information, and
determine number of persons seated in seats in each row of the vehicle based on the group association information and calculating number of passengers by integrating the numbers of persons in the respective rows.

16. The passenger counting device according to claim 15, wherein the processor is further configured to process the instructions to:
estimate geometric distortion in the image, and
perform correction on the image based on the estimated geometric distortion and detects a person in the corrected image.

17. The passenger counting device according to claim 1, wherein the processor is further configured to process the instructions to:
estimate geometric distortion in the image, and
perform correction on the image based on the estimated geometric distortion and detects a person in the corrected image.

18. The passenger counting device according to claim 1, wherein the processor is further configured to process the instructions to:
- estimate geometric distortion in the image, and
- detect a person in the image by using a person detector corresponding to the estimated geometric distortion.

19. A passenger counting method comprising:
- detecting a specific part of a vehicle in an image and generating specific-part detection results;
- calculating a movement amount of the vehicle by associating the specific-part detection results with each other in images, and generating vehicle movement information including a result of the calculation;
- detecting a person who is a passenger, in the acquired images and generating person detection results including position information of the detected person; and
- integrating the person detection results by associating the images based on the vehicle movement information and thereby determining number of passengers.

20. A non-transitory computer-readable program recording medium recording a passenger counting program causing a computer to execute:
- a process of detecting a specific part of a vehicle in an image and generating specific-part detection results;
- a process of calculating a movement amount of the vehicle by associating the specific-part detection results with each other in images, and generating vehicle movement information including a result of the calculation;
- a process of detecting a person who is a passenger, in the acquired images and generating person detection results including position information of the detected person; and
- a process of integrating the person detection results by associating the images based on the vehicle movement information and thereby determining number of passengers.

* * * * *